United States Patent [19]

Wylegala et al.

[11] 4,455,252

[45] Jun. 19, 1984

[54] PHLEGMATIZATION OF ORGANIC PEROXIDES BY METALLIC SOAPS

[75] Inventors: Kenneth B. Wylegala, Kenmore, N.Y.; James R. Fischer; Franklin A. Long, both of Claremont, Calif.; Deborah L. Golob, Pasadena, Calif.

[73] Assignee: The Norac Company, Inc., Azusa, Calif.

[21] Appl. No.: 285,846

[22] Filed: Jul. 22, 1981

Related U.S. Application Data

[63] Continuation of Ser. No. 150,755, May 19, 1980, abandoned.

[51] Int. Cl.³ .................. C09K 15/06; C07C 73/00
[52] U.S. Cl. .................. 252/186.26; 252/407; 252/399; 44/7.5; 502/160; 149/44; 149/108.8; 106/310; 568/414
[58] Field of Search .................. 252/96, 186, 396, 407; 44/7 A, 7 C, 77; 149/44, 108.8, 109.4; 106/310; 502/160; 568/414

[56] References Cited

U.S. PATENT DOCUMENTS

| 2,288,410 | 6/1942 | Lippman, Jr. | 252/186 |
| 2,385,135 | 9/1945 | Holmes | 149/10 |
| 2,453,071 | 11/1948 | Hyatt et al. | 252/186 X |
| 2,909,418 | 10/1959 | Pearsall | 149/38 |
| 2,939,795 | 6/1960 | Lecompte | 106/310 |
| 3,015,631 | 1/1962 | McCloskey | 252/426 |
| 3,166,431 | 1/1965 | Mullaly | 106/310 X |
| 3,507,800 | 4/1970 | Leveskis | 252/186 |
| 3,557,009 | 1/1971 | McCloskey et al. | 252/186 |
| 3,649,546 | 3/1972 | McCloskey et al. | 252/186 |
| 3,649,548 | 3/1972 | McCloskey et al. | 252/186 |
| 3,692,841 | 9/1972 | McCloskey et al. | 260/610 R |
| 3,784,005 | 1/1974 | McVay | 206/84 |
| 3,902,596 | 9/1975 | McVay | 206/84 |
| 4,131,728 | 12/1978 | Priddy | 526/204 |
| 4,310,444 | 1/1982 | Hamada et al. | 524/322 |

FOREIGN PATENT DOCUMENTS 955079  4/1964  United Kingdom .

OTHER PUBLICATIONS

Chemical Abstracts, vol. 40, col. 6818⁹, vol. 55, col. 27890d, vol. 53, col. 18487f, 18487i.
Proceedings of 31st Annual Technical Conference, 1976, Reinforced Plastics/Composites Institute, The Society of the Plastics Industry, Inc., Section 2-A, pp. 1-3; Section 2-B, pp. 1-5; Section 2-D, pp. 1-16; Section 2-E, pp. 1-9.

Primary Examiner—John D. Welsh
Attorney, Agent, or Firm—Keil & Witherspoon

[57]  ABSTRACT

A phlegmatized organic peroxide composition is disclosed which contains a liquid organic peroxide and a metallic soap of a higher fatty acid in an amount sufficient to phlegmatize the liquid peroxide. Viscosity modifiers may be added to render the composition nontacky.

33 Claims, No Drawings

PHLEGMATIZATION OF ORGANIC PEROXIDES BY METALLIC SOAPS

This is a continuation of application Ser. No. 150,755 filed May 19, 1980, abandoned.

This invention relates to new, low-hazard organic peroxide initiator compositions. More specifically, the invention relates to phlegmatizing organic peroxides with metallic soaps and to the products obtained therefrom.

BACKGROUND OF THE INVENTION

Organic peroxides have a wide variety of uses. For example, they are used extensively for the initiation of polymerization of ethylenically unsaturated compounds and as bleaching agents. Their use in these and other applications is well known in the art.

In order to provide compositions that are safer to use, ship and store, organic peroxides are often marketed in diluted forms. The diluent can be either liquid or solid. Common liquid diluents are high-boiling plasticizers such as dioctyl phthalate, dimethyl phthalate, butyl benzyl phthalate, diallyl phthalate or paraffinic substances such as odorless mineral spirits. The solid diluents can be either organic or inorganic. Typical solid, organic diluents are starch and dicyclohexyl phthalate. Typical solid, inorganic diluents are calcium carbonate, gypsum and dicalcium phosphate dihydrate.

The selection of a diluent depends on many factors. Not all diluents are effective phlegmatizers. The selection of a diluent is also limited by lack of compatability of the diluent with the organic peroxide and/or with the application in which the composition is employed. Further, diluents that are effective or useful for one type of organic peroxide may not be effective or useful for another. Many times the physical form of the diluent makes it suitable for only certain peroxides or for certain uses. Starch, gypsum, calcium phosphate dihydrate and dicyclohexyl phthalate, for example, are used almost exclusively for the phlegmatization of benzoyl peroxide. Solid, organic diluents may be soluble in liquid organic peroxides.

OBJECTS OF THE INVENTION

It is an object of this invention to provide organic peroxide compositions that are substantially free from the burning and explosive hazards that many organic peroxides normally exhibit.

It is another object of the invention to provide organic peroxide compositions that are efficient initiators and that are easily and safely handled in their use in the polymerization of ethylenically unsaturated compounds.

These and other objects have been achieved by the present invention.

DESCRIPTION OF THE INVENTION

It has now been discovered that the metallic soaps of higher fatty acids are efficient phlegmatizers for organic peroxides, suppressing both fire and explosive hazard. It has been further discovered that the metallic soaps of stearic and palmitic acids and their mixtures, which are the common stearates of commerce, are particularly effective in this regard. Although they are more organic than inorganic in composition, metallic soaps of higher fatty acids are insoluble or have only limited solubility in liquid organic peroxides.

Metallic soaps of higher fatty acids in general have been found to be effective. Thus soaps of lithium, calcium, magnesium, zinc, strontium, cadmium, barium, aluminum and manganese are all operative with manganese soaps sometimes being less effective than the others. Soaps such as those of cobalt, iron, nickel and lead are also effective phlegmatizers for many of the organic peroxides, but these soaps have other characteristics such as toxicity, color, cost or reactivity with some of the organic peroxides so as to make their commercial application more limited.

The soaps of elements in group II of the Periodic Table, particularly those of calcium, magnesium, zinc, strontium, cadmium and barium, plus the soaps of lithium and aluminum are the most commercially useful. Those of calcium, magnesium and zinc are preferred. Soaps of zinc give the best combination of efficiency, cost and compatability with the product in which the peroxide is employed. Mixtures of soaps are operative.

Organic peroxides in general are phlegmatized by metallic soaps. While solid organic peroxides are effectively phlegmatized by metallic soaps, the difficulty in keeping the mixture of two solid components uniform without the addition of considerable amounts of secondary diluents make such mixtures less attractive practically and economically than those with liquid organic peroxides. Among those types of organic peroxides that have been found to be particularly useful in the instant invention are dialkyl peroxides; tertiary-alkyl peroxyesters; and di(tertiary-alkylperoxy)ketals. Tertiary-alkyl hydroperoxides are effective but some compositions with metallic soaps, particularly those that are temperature sensitive, have limited storage life. Compositions with open-chain ketone peroxides are particularly susceptible to loss of activity.

Typical of the organic peroxides that have been found to be particularly useful are:

diperoxides: di-tertiary-butyl peroxide, dicumyl peroxide, α,α-di(tertiary-butylperoxy)diisopropylbenzene peroxide, 2,5-dimethyl-2,5-di(tertiary-butylperoxy)hexane.

peroxy ketals: 1,1-di(tertiary-butylperoxy)-cyclohexane, 1,1-di(tertiary-butylperoxy)-3,3,5-trimethylcyclohexane, 2,2-(tertiary-butylperoxy)butane, 2,2-di(tertiary-butylperoxy)propane, ethyl 3,3-di(tertiary-butylperoxy)butyrate.

peroxy esters: tertiary-butyl peracetate, di-tertiarybutyl diperphthalate, tertiary-butyl perbenzoate, 1,1,3,3-tetramethylbutyl perbenzoate, tertiary-butylperoxy isopropyl carbonate.

hydroperoxides: tertiary-butyl hydroperoxide, 1,1,3,3-tetramethyl hydroperoxide, cumene hydroperoxide, diisopropylbenzene dihydroperoxide.

It has been found that relatively small amounts of metallic soaps added to organic peroxides reduce significantly the hazard exhibited by the latter alone. As more metallic soap is added, the resulting compositions have a lower and lower hazard so that a composition eventually can be obtained that no longer exhibits the hazards characteristic of the organic peroxide and can in fact exhibit properties free of the dust-hazard problems of metallic soaps as well. This is of particular advantage in those cases where metallic soaps are also employed in the polymerization process, since the explosive hazard and employee exposure associated with fine organic particles which dust readily, such as metallic soaps, is reduced. Additional advantages are that compositions of organic peroxides and metallic soaps are easily handled and can be readily dispersed in monomers or resins.

The practical limit to the maximum concentration of metallic soap that can be employed with liquid organic peroxides is the physical form desired and the tolerance to the metallic soap in the application or product in which the composition is utilized. As a practical composition, organic peroxide-metallic soap compositions containing from 1 to 95% metallic soap are useful, with 5 to 90% preferred and 20 to 85% optimum, all percentages by weight and based on total peroxide and metallic soap.

In some instances, nominal amounts of other (secondary) diluents may be needed to obtain a composition in a commercially acceptable physical form. Thus, depending on the proportion, particle size, chemical composition, etc. of the particular metallic soap and peroxide employed in a given situation, the resulting composition may be pasty, tacky, or friable. A tacky condition is often undesirable, but the inclusion of additional metallic soap may be deleterious to the ultimate polymer system in which it is employed. The additional (secondary) diluent may be present in the organic peroxides from the manufacturing process. Such diluents are in most cases liquids such as diallyl phthalate, dioctyl phthalate, dibutyl phthalate, dimethyl phthalate, odorless mineral spirits, etc. Of course, this diluent also must be compatible with the resin or polymer system with which it is employed. For example, odorless mineral spirits might be compatible with a polyolefin system but present undesirable characteristics with unsaturated polyester systems. Mineral oil in appreciable amounts is undesirable in most any polymer system. The secondary diluent can be a solid such as calcium carbonate or talc.

The above-described "secondary diluent" might also be termed a "viscosity modifier".

The term "higher fatty acids" as used herein refers to those predominately saturated fatty acids, including $C_{12}$ to $C_{22}$ and their common commerical mixtures. Most commercial higher fatty acids are mixtures of several fatty acids.

The term "stearate" is used herein to refer not only to soaps prepared from essentially pure stearic acid, but is used also in its common commercial sense. Such "stearates" are commonly prepared from a mixture of stearic and palmitic acids and can even be predominately a palmitate. U.S.P. stearic acid, for example, contains more palmitic acid than stearic acid. It also contains small amounts of lauric, myristic, oleic and palmitoleic acids. Hydrogenated fish fatty acids contain $C_{20}$ and $C_{22}$ acids as well as stearic and palmitic acids, while palm-oil fatty acids contain a large amount of lauric acid.

The terms "metallic soaps of higher fatty acids" and "metallic stearates" as used herein refer to the water-insoluble soaps of the fatty acids. Of practical commercial importance are those soaps formed from cations of calcium, magnesium, zinc, strontium, cadmium and barium of group II of the Periodic Table and of lithium, aluminum, manganese, lead and iron. Of less commercial importance are those of copper, nickel and cobalt.

The term "metallic soaps" as used herein refers to their common commercial form, which is normally that of a fine powder. The particle size generally ranges from less than 1 micron to 300 microns in size with 0.5 to 50 microns being the most common. In order to be a practical effective phlegmatizer, the metallic soap must be capable of being dispersed in or blended with the organic peroxide with a minimum of separation or segregation. The common commercial forms of the metallic soaps meet this requirement.

The term "phlegmatizer" is used herein in its conventional sense in explosive technology, i.e., to describe materials that desensitize or stabilize by suppressing explosive decomposition and energy release. It does not mean or imply, however, that there is necessarily an increase in the storage stability, e.g., a reduction in loss of activity with time. Metallic soaps may or may not increase the storage stability. Some may increase significantly the loss of activity with time of some types of organic peroxides, such as the open-chain ketone peroxides, while at the same time reducing the hazard.

The term "liquid organic peroxide" as used herein refers to those organic peroxides that are liquid at room temperature and also to those that are liquid at slightly elevated temperatures so that they can be combined with the metallic soap while in a liquid state. The temperature stability of the organic peroxide determines the temperature which is operative, but generally those peroxides that melt at 50° C. or below are preferred.

The term "alkyl" as used herein includes cycloalkyl (e.g. cyclohexyl) as well as substituted alkyl (e.g. trimethylcyclohexyl) and aralkyl as in 2-phenylpropyl.

EXAMPLE 1

Effect of Diluents on the Energy Release of tert-Butyl Perbenzoate Compositions as Measured by the Modified Trauzl Test[1]

| Composition | | Expansion of Trauzl Block |
|---|---|---|
| tert-Butyl perbenzoate | Diluent | |
| 99% | — | 29.8, 30.4 ml |
| 66 | sand | 22.2, 23.2 |
| " | dimethyl phthalate | 16.4, 16.4 |
| " | zinc stearate | 14.4, 14.4 |
| 50% | sand | 18.3, 19.0 ml |
| " | dimethyl phthalate | 13.6, 13.6 |
| " | zinc stearate | 12.1, 12.6, 12.6, 13.5 |
| " | calcium stearate | 12.6, 13.5, 13.5, 13.6 |
| " | magnesium stearate | 12.7, 13.1 |
| 29.4% | dimethyl phthalate | 13.1, 13.7 ml |
| " | diallyl phthalate | 13.2, 13.9 |
| " | zinc stearate | 12.8, 13.2 |
| 22% | zinc stearate 52%<br>diallyl phthalate 26% | 12.7, 13.1 ml |
| 0% | diallyl phthalate | 11.2, 12.5 ml |
| " | zinc stearate 70%<br>diallyl phthalate 30% | 11.8, 12.8 |

[1] "Suggested Relative Hazard Classification of Organic Peroxides," The Society of the Plastics Industry, Inc., The Organic Peroxide Producers Safety Division. The modified trauzl test is based on a test developed by Dr. Chester Grelecki, Hazards Research Corp., and further described by O. T. Mageli et al., Ind. Eng. Chem., 56, 18 (1964). It measures the energy release of a standard sample by the increase in the expansion of a cavity in a standard lead block, created by the detonation of a No. 8 blasting cap in the test sample, over that created by the detonation of the cap in an inert material. The smaller the increase in the expansion over that of the blank, the smaller the energy release.

EXAMPLE 2

Relative Hazards of Organic Peroxide Compositions
as Measured by the Pressure Vessel Test[2]

| Organic Peroxide | | Diluent | Minimum Orifice Without Rupture |
|---|---|---|---|
| | | | 100 psi burst diaphragm |
| tert-Butyl perbenzoate | 99% | — | 8 mm |
| tert-Butyl perbenzoate | 75 | dimethyl phthalate | 6 |
| tert-Butyl perbenzoate | 75 | odorless mineral spirits | 3 |
| tert-Butyl perbenzoate | 75 | zinc stearate | 1 |
| tert-Butyl perbenzoate | 75 | calcium stearate | 1.5 |
| tert-Butyl perbenzoate | 50 | dimethyl phthalate | 2 |
| tert-Butyl perbenzoate | 50 | odorless mineral spirits | 1 |
| tert-Butyl perbenzoate | 50 | zinc stearate | 1 |
| tert-Butyl perbenzoate | 50 | calcium stearate | 1 |
| | | | 85 psi burst diaphragm |
| tert-Butyl perbenzoate | 75% | corn starch | 5 mm |
| tert-Butyl perbenzoate | 75% | calcium carbonate | 7 |
| tert-Butyl perbenzoate | 75% | calcium stearate | 2 |
| tert-Butyl perbenzoate | 75% | zinc stearate | 1 |
| tert-Butyl perbenzoate | 75% | barium stearate | 1 |
| tert-Butyl perbenzoate | 75% | lithium stearate | 1 |
| tert-Butyl perbenzoate | 75% | zinc stearate 12.5%<br>calcium stearate 12.5% | 1 |
| tert-Butyl perbenzoate | 75% | zinc soap of coconut oil fatty acid | 1 |
| tert-Butyl perbenzoate | 75% | zinc soap of fish oil fatty acid | 1 |
| tert-Butyl perbenzoate | 50 | calcium carbonate | 2 |
| tert-Butyl perbenzoate | 50 | manganese stearate | 1 |
| tert-Butyl perbenzoate | 50 | barium stearate | 1 |
| tert-Butyl perbenzoate | 50 | zinc stearate | 1 |
| tert-Butyl per-2-ethyl-hexanoate | 93% | — | 7 mm |
| tert-Butyl per-2-ethyl-hexanoate | 74 | dioctyl phthalate | 5.5 |
| tert-Butyl per-2-ethyl-hexanoate | 74 | zinc stearate | 4.5 |
| tert-Butyl per-2-ethyl-hexanoate | 50 | dioctyl phthalate | 2.5 |
| tert-Butyl per-2-ethyl-hexanoate | 50 | zinc stearate | 1 |
| 1,1-Di(tert-butylperoxy)cyclohexane | 75% | dioctyl phthalate | 11 mm |
| 1,1-Di(tert-butylperoxy)cyclohexane | 52 | dioctyl phthalate | 6 |
| 1,1-Di(tert-butylperoxy)cyclohexane | 52 | zinc stearate 33%<br>dioctyl phthalate 17% | 1 |
| 1,1-Di(tert- | 50% | dibutyl phthalate | 3.5 mm |

-continued
Relative Hazards of Organic Peroxide Compositions as Measured by the Pressure Vessel Test[2]

| Organic Peroxide | | Diluent | Minimum Orifice Without Rupture |
|---|---|---|---|
| butylperoxy)-3,3,5-trimethylcyclohexane | | | |
| 1,1-Di(tert-butylperoxy)-3,3,5-trimethylcyclohexane | 50% | dibutyl phthalate 17%<br>zinc stearate 33% | 1 |

[2]"Suggested Relative Hazard Classification of Organic Peroxides," The Society of the Plastics Industry, Inc., The Organic Peroxide Producers Safety Division. The pressure vessel test was developed in Holland by Dr. E. W. Lindeijer at the Technological Laboratory of the National Defense Research Organization and work with it in this country is described by O. T. Mageli et al., Ind. Eng. Chem. 56, 18 (1964). It consists essentially of a pressure vessel into which a sample is placed in a standard metal cup. On top is fitted a burst diaphragm normally calibrated for 100 psi. (A lower pressure rating requires a larger aperture). On the side is a fitting into which discs having varying apertures can be inserted. Using a standard heating rate, the smallest aperture that can be tolerated without rupture of the burst diaphragm is determined for a given compound. The smaller the aperture the less hazardous the compound.

EXAMPLE 3

Burning Characteristic[3] (Flame Height) of Organic Peroxide Compositions

| Organic Peroxide | | Diluent | Maximum Flame Height |
|---|---|---|---|
| tert-Butyl perbenzoate | 99% | — | >150 cm |
| tert-Butyl perbenzoate | 75 | dimethyl phthalate | 148 |
| tert-Butyl perbenzoate | 75 | odorless mineral spirits | 135 |
| tert-Butyl perbenzoate | 75 | calcium carbonate | 145 |
| tert-Butyl perbenzoate | 75 | zinc stearate | 108 |
| tert-Butyl perbenzoate | 75 | calcium stearate | 67 |
| tert-Butyl perbenzoate | 75 | barium stearate | 65 |
| tert-Butyl perbenzoate | 75 | lithium stearate | 52 |
| tert-Butyl perbenzoate | 75 | zinc stearate 12.5%<br>calcium stearate 12.5% | 77 |
| tert-Butyl perbenzoate | 75 | zinc soap of coconut oil fatty acid | 120 |
| tert-Butyl perbenzoate | 75 | zinc soap of fish oil fatty acid | 110 |
| tert-Butyl perbenzoate | 50% | dimethylphthalate | 128 cm |
| tert-Butyl perbenzoate | 50% | odorless mineral spirits | 108 |
| tert-Butyl perbenzoate | 50% | calcium carbonate | 95 |
| tert-Butyl perbenzoate | 50% | zinc stearate | 40 |
| tert-Butyl perbenzoate | 50% | calcium stearate | 30 |
| tert-Butyl perbenzoate | 50% | barium stearate | 27 |
| tert-Butyl perbenzoate | 50% | manganese stearate | 55 |
| tert-Butyl perbenzoate | 50% | lithium stearate | 21 |
| tert-Butyl perbenzoate | 50% | calcium stearate 25%<br>zinc stearate 25% | 28 |
| tert-Butyl perbenzoate | 50% | zinc soap of coconut oil fatty acid | 47 |
| tert-Butyl perbenzoate | 50% | zinc soap of fish oil fatty acid | 40 |
| tert-Butyl | 29% | dimethyl phthalate | 85 cm |

Burning Characteristic[3] (Flame Height) of Organic Peroxide Compositions -continued

| Organic Peroxide | | Diluent | Maximum Flame Height |
|---|---|---|---|
| tert-Butyl perbenzoate | 29% | diallyl phthalate | 85 |
| tert-Butyl perbenzoate | 29% | odorless mineral spirits | 88 |
| tert-Butyl perbenzoate | 29% | zinc stearate | 22 |
| tert-Butyl perbenzoate | 22% | dimethyl phthalate | 85 cm |
| tert-Butyl perbenzoate | 22% | diallyl phthalate | 87 |
| tert-Butyl perbenzoate | 22% | odorless mineral spirits | 74 |
| tert-Butyl perbenzoate | 22% | zinc stearate | 14 |
| tert-Butyl perbenzoate | 22% | zinc stearate 52.5% diallyl phthalate 25.5% | 26 |
| tert-Butyl per-2-ethyl-hexanoate | 93% | — | >151 cm |
| tert-Butyl per-2-ethyl-hexanoate | 74 | dioctyl phthalate | >151 |
| tert-Butyl per-2-ethyl-hexanoate | 74 | zinc stearate | 145 |
| tert-Butyl per-2-ethyl-hexanoate | 50 | dioctyl phthalate | 137 |
| tert-Butyl per-2-ethyl-hexanoate | 50 | zinc stearate | 50 |
| 1,1-Di(tert-butylperoxy)cyclohexane | 50% | dioctyl phthalate | >151 cm |
| 1,1-Di(tert-butylperoxy)cyclohexane | 50% | dioctyl phthalate 17% zinc stearate 33% | 89 |
| 1,1-Di(tert-butylperoxy)3,3,5-trimethylcyclohexane | 50% | dibutyl phthalate | >151 cm |
| 1,1-Di(tert-butylperoxy)3,3,5-trimethylcyclohexane | 50% | dibutyl phthalate 17% zinc stearate 33% | 66 |
| Di-tert-butyl peroxide | 100% | — | 90 cm |
| Di-tert-butyl peroxide | 50 | dimethyl phthalate | 66 |
| Di-tert-butyl peroxide | 50 | calcium stearate | 40 |
| tert-Butyl hydroperoxide | 82% | water 18% | 75 cm |
| tert-Butyl hydroperoxide | 50 | odorless mineral spirits 43% water 7% | 45 |
| tert-Butyl hydroperoxide | 50 | zinc stearate 39% water 11% | 35 |

[3]Burning test described in: "Suggested Relative Hazard Classification of Organic Peroxides", The Society of the Plastics Industry, Inc., The Organic Peroxide Producers Safety Division. The lower the flame height the lower the hazard rating.

EXAMPLE 4

The rate of incorporation of metallic stearates and metallic stearate-organic peroxide compositions into an "unsaturated polyester resin", was determined by stirring 2.0 g of metallic stearate, or the amount of the composition containing 2.0 g of metallic stearate, into 25 g of resin.

| Composition | | | | |
|---|---|---|---|---|
| tert-Butyl perbenzoate | Metallic Stearate | | Form | Time to Disperse[4] |
| 0% | zinc stearate[5] | 100% | dry solid | 40 sec. |
| 20 | " | 80 | " | 15 |
| 25 | " | 75 | " | 10 |
| 0 | zinc stearate[6] | 100 | " | 25 |
| 20 | " | 80 | " | 10 |
| 0 | calcium stearate[7] | 100 | " | 40 |
| 20 | " | 80 | " | 10 |
| 0 | magnesium stearate[8] | 100 | " | 30 |
| 20 | " | 80 | " | 12 |

[4]Rapid stirring using a wood tongue depressor.
[5]Average particle size 3 microns.
[6]Average particle size 12 microns.
[7]Average particle size 12 microns.
[8]Average particle size 2.5 microns.

EXAMPLE 5

The effect on the physical state of mixtures of tertiary-butyl perbenzoate and various metallic stearates (no secondary diluents) was determined by varying the peroxide/stearate ratio, the weight percent peroxide, and the nature of the stearate.

| TBPB/Stearate Ratio | TBPB Wt. % | Metallic Stearate | | | |
|---|---|---|---|---|---|
| | | Zn (3–4 microns) | Zn (10–12 microns) | Ca (10–12 microns) | Mg (2–3 microns) |
| 1:0.5 | 66 | slight separation 1 month a 25° C. | separation 1 month a 25° C. | — | — |
| 1:1 | 50 | paste | paste | soft paste | stiff paste |
| 1:1.5 | 40 | stiff paste | — | — | — |
| 1:2 | 33 | — | — | stiff paste | — |
| 1:3 | 25 | solid | oily solid | — | oily solid |
| 1:4 | 20 | dry solid | dry solid | oily solid | dry solid |

— indicates mixture was not made

| Stearate Wt. % | TBPB Wt. % | Bulk Density, Grams/cc | | | |
|---|---|---|---|---|---|
| | | Metallic Stearate | | | |
| | | Zn (3–4 microns) | Zn (10–12 microns) | Ca (10–12 microns) | Mg (2–3 microns) |
| 100 | 0 | 0.121 | 0.315 | 0.275 | 0.113 |
| 80 | 20 | 0.483 | 0.476 | 0.524 | 0.411 |
| 75 | 25 | 0.525 | 0.533 | — | 0.505 |

— indicates mixture was not made

The following general conclusions can be drawn: (1) the consistency of the mixture is dependent on particle size; (2) separation occurs in mixtures richer in TBPB than ~60%; (3) the best handling properties are found around 20-25% and around 45-55% TBPB; (4) each stearate exhibits a transition area that is neither paste nor oily solid, usually ~1:2 or 1:3; (5) Zn stearate phlegmatizes TBPB in the Trauzl Test as well as or better than DMP; (6) adding TBPB to stearate increases the bulk-density from 50% to 400%; and (7) the resulting TBPB-stearate mixes are more easily wet by resin than stearate alone.

We claim:

1. A phlegmatized organic peroxide composition consisting essentially of a liquid organic peroxide having a melting point below 50 C. and a metallic soap of higher fatty acid, said metallic soap being present in an amount sufficient to phlegmatize said peroxide and in an amount from 5 to 90% by weight based on total peroxide and metallic soap.

2. The composition of claim 1 wherein the metallic soap is a stearate.

3. The composition of claim 2 wherein said stearate is a lithium, calcium, magnesium, zinc, strontium, cadmium, barium, aluminum or manganese stearate.

4. The composition of claim 3 wherein said stearate is a calcium, magnesium or zinc stearate.

5. The composition of claim 4 wherein said stearate is zinc stearate.

6. The composition of claim 2 wherein the organic peroxide is selected from the group consisting of dialkyl peroxides, tertiary-alkyl peroxyesters, di(tertiary-alkylperoxy)ketals, and tertiary-alkyl hydroperoxides.

7. The composition of claim 1 wherein said metallic soap is lithium, calcium, magnesium, zinc, strontium, cadmium, barium, aluminum or manganese stearate and said organic peroxide is selected from the group consisting of dialkyl peroxides, tertiary-alkyl peroxyesters, di(tertiary-alkylperoxy)ketals, and tertiary-alkyl hydroperoxides.

8. The composition of claim 1 wherein said metallic soap is a calcium, magnesium or zinc stearate and said organic peroxide is selected from the group consisting of dialkyl peroxides, tertiary-alkyl peroxyesters, di(tertiary-alkylperoxy)ketals, and tertiary-alkyl hydroperoxides.

9. The composition of claim 2 wherein the organic peroxide is selected from the group consisting of dialkyl peroxides, tertiary-alkyl peroxyesters and di(tertiary-alkylperoxy)ketals.

10. The composition of claim 1 wherein said metallic soap is a lithium, calcium, magnesium, zinc, strontium, cadmium, barium, aluminum or manganese stearate and said organic peroxide is selected from the group consisting of dialkyl peroxides, tertiary-alkyl peroxyesters and di(tertiary-alkylperoxy)ketals.

11. The composition of claim 1 wherein said metallic soap is a calcium, magnesium or zinc stearate and said organic peroxide is selected from the group consisting of dialkyl peroxides, tertiary-alkyl peroxyesters and di(tertiary-alkylperoxy)ketals.

12. The composition of claim 1 wherein said metallic soap is zinc stearate and said organic peroxide is selected from the group consisting of dialkyl peroxides, tertiary-alkyl peroxyesters and di(tertiary-alkylperoxy)ketals.

13. The composition of claim 2 wherein the organic peroxide is a tertiary-alkyl peroxyester.

14. The composition of claim 1 wherein said metallic soap is a lithium, calcium, magnesium, zinc, strontium, cadmium, barium, aluminum or manganese stearate and said organic peroxide is a tertiary-alkyl peroxyester.

15. The composition of claim 1 wherein said metallic soap is a calcium, magnesium or zinc stearate and said organic peroxide is a tertiary-alkyl peroxyester.

16. The composition of claim 1 wherein said metallic soap is zinc stearate and said organic peroxide is a tertiary-alkyl peroxyester.

17. The composition of claim 13 wherein said peroxyester is tertiary-butyl perbenzoate.

18. The composition of claim 1 wherein said metallic soap is a lithium, calcium, magnesium, zinc, strontium, cadmium, barium, aluminum or manganese stearate and said peroxide is tertiary-butyl perbenzoate.

19. The composition of claim 1 wherein said metallic soap is a calcium, magnesium or zinc stearate and said organic peroxide is tertiary-butyl perbenzoate.

20. The composition of claim 1 wherein said metallic soap is zinc stearate and said organic peroxide is tertiary-butyl perbenzoate.

21. The composition of claim 2 wherein the organic peroxide is a di(tertiary-alkylperoxy)ketal.

22. The composition of claim 2 wherein said stearate is lithium, calcium, magnesium, zinc, strontium, cadmium, barium, aluminum or manganese stearate and the organic peroxide is a di(tertiary-alkylperoxy)ketal.

23. The composition of claim 2 wherein said stearate is a calcium, magnesium or zinc stearate and the organic peroxide is a di(tertiary-alkylperoxy)ketal.

24. The composition of claim 2 wherein said stearate is zinc stearate and the organic peroxide is a di(tertiary-alkylperoxy)ketal.

25. The composition of claim 21 wherein said peroxy ketal is selected from the group consisting of di(tertiary-butyl peroxy)cyclohexane and di(tertiary-butyl peroxy)-3,3,5-trimethylcyclohexane.

26. The composition of claim 2 wherein the organic peroxide is selected from the group consisting of di(tertiary-butyl peroxy)cyclohexane and di(tertiary-butyl peroxy)-3,3,5-trimethylcyclohexane.

27. The composition of claim 2 wherein said stearate is lithium, calcium, magnesium, zinc, strontium, cadmium, barium, aluminum or manganese stearate and the organic peroxide is selected from the group consisting of di(tertiary-butyl peroxy)cyclohexane and di(tertiary-butyl peroxy)-3,3,5-trimethylcyclohexane.

28. The composition of claim 3 wherein said stearate is a calcium, magnesium or zinc stearate and the organic peroxide is selected from the group consisting of di(tertiary-butyl peroxy)cyclohexane and di(tertiary-butyl peroxy)-3,3,5-trimethylcyclohexane.

29. The composition of claim 4 wherein said stearate is zinc stearate and the organic peroxide is selected from the group consisting of di(tertiary-butyl peroxy)cyclohexane and di(tertiary-butyl peroxy)-3,3,5-trimethylcyclohexane.

30. A phlegmatized peroxide composition consisting essentially of a liquid organic peroxide having a melting point below 50 C., a metallic soap of higher fatty acid in an amount sufficient to phlegmatize said peroxide and in an amount from 5 to 90% by weight based on total peroxide and metallic soap, and a viscosity modifier in an amount, including zero, sufficient to render said composition non-tacky.

31. A composition as defined in claim 30 and which is in the form of a dry non-fluffy solid.

32. A composition as defined in claim 30 and which is in the form of an oily solid.

33. A composition as defined in claim 30 and which is in the form of a paste.

* * * * *